Sept. 20, 1932.  N. H. GAY  1,878,694
REFRIGERATING SYSTEM WITH LIQUID AND GAS TRAPS
Filed Aug. 9, 1930  3 Sheets-Sheet 1
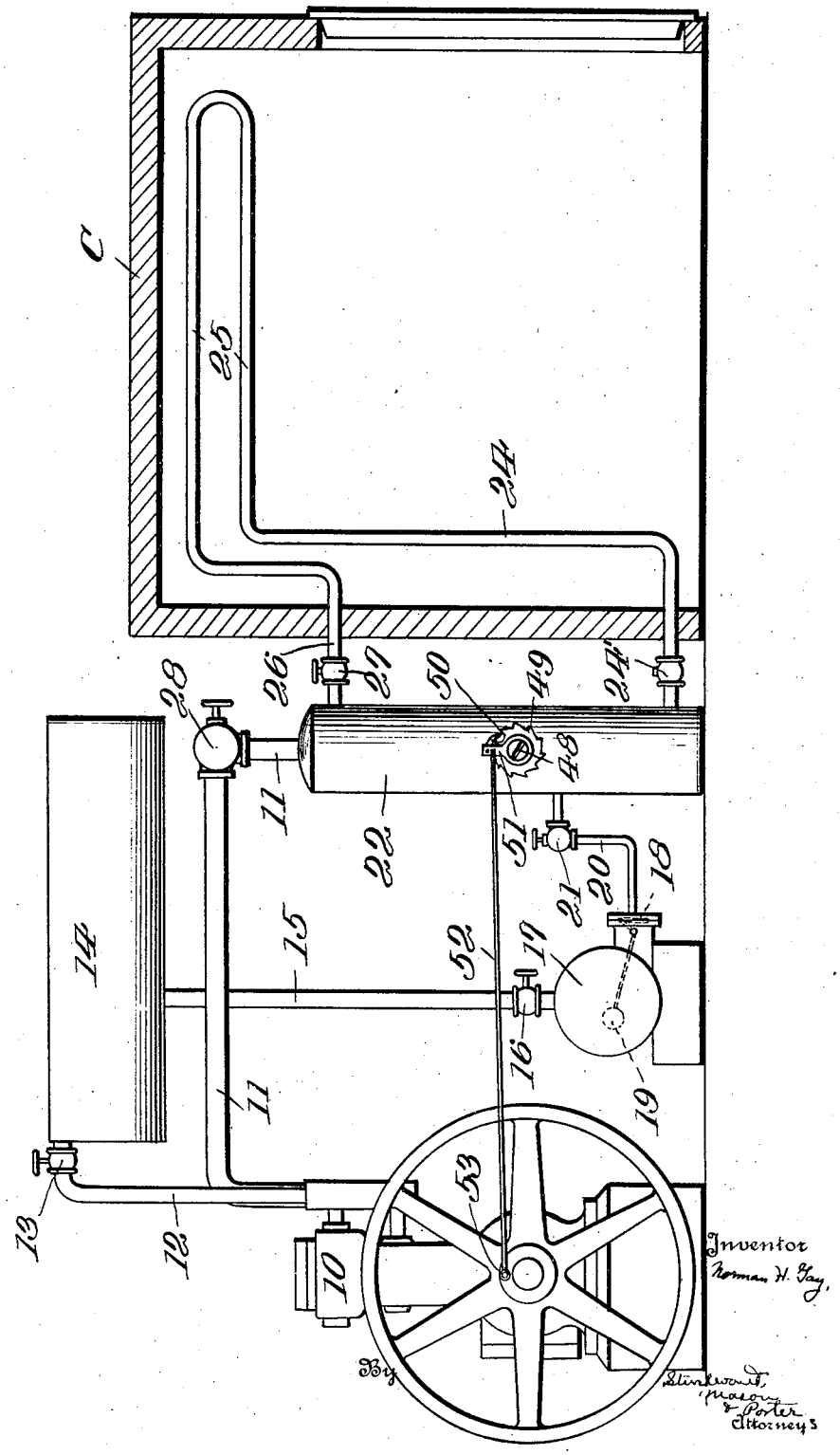

Sept. 20, 1932.  N. H. GAY  1,878,694
REFRIGERATING SYSTEM WITH LIQUID AND GAS TRAPS
Filed Aug. 9, 1930  3 Sheets-Sheet 2
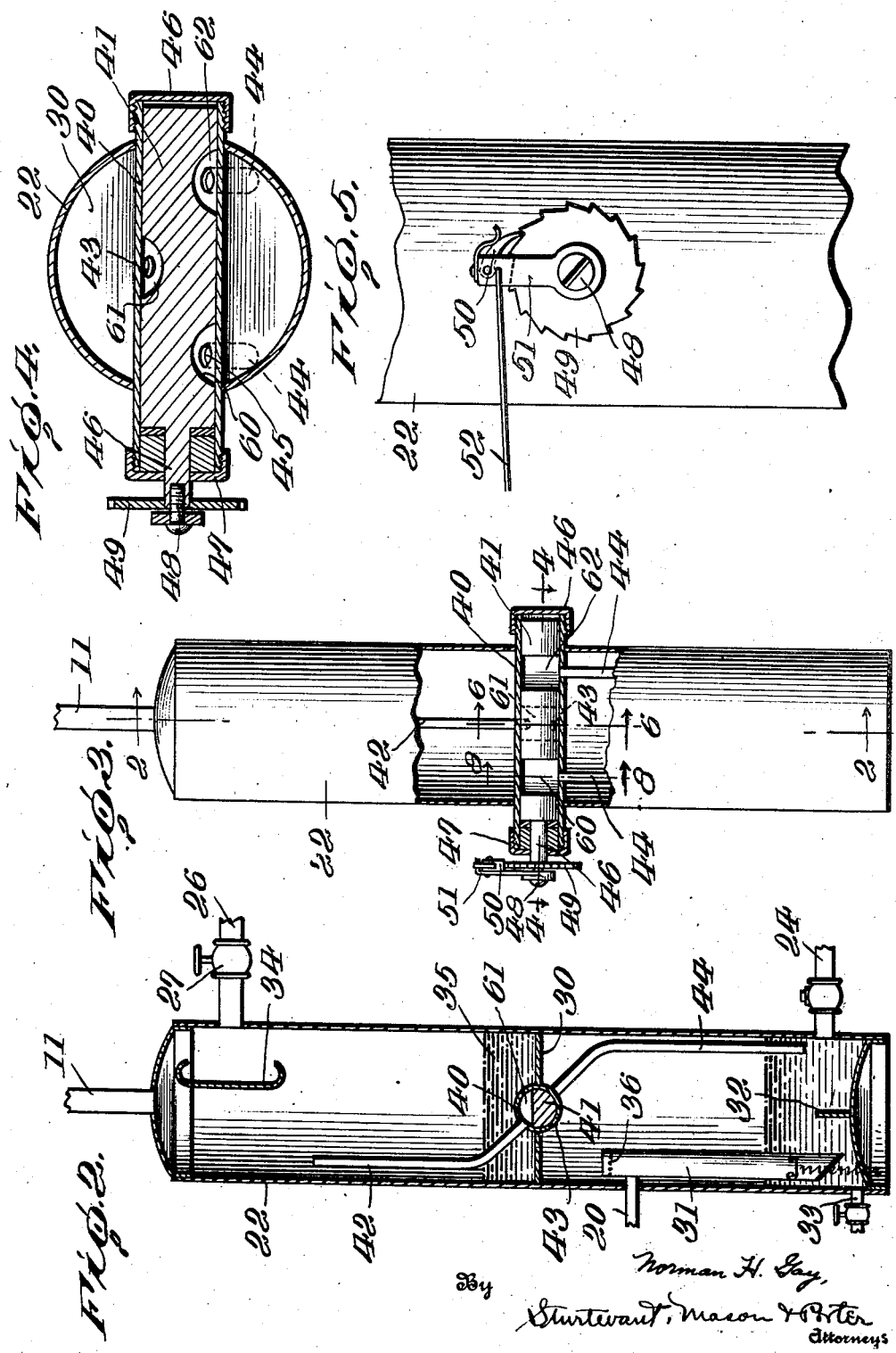

Sept. 20, 1932.    N. H. GAY    1,878,694
REFRIGERATING SYSTEM WITH LIQUID AND GAS TRAPS
Filed Aug. 9, 1930    3 Sheets-Sheet 3

Inventor
Norman H. Gay,

By Sturtevant, Mason & Porter
Attorneys

Patented Sept. 20, 1932

1,878,694

UNITED STATES PATENT OFFICE

NORMAN H. GAY, OF LOS ANGELES, CALIFORNIA

REFRIGERATING SYSTEM WITH LIQUID AND GAS TRAPS

Application filed August 9, 1930. Serial No. 474,178.

The present invention relates to refrigerating systems, and more particularly to an accumulator having an automatic valve for returning liquid from the outlet side of the accumulator to the inlet side, and for passing gas directly from the inlet side to the outlet side.

In refrigerating plants of all types, it is highly desirable to provide a trap on the line returning from the evaporator to the compressor, to remove liquid refrigerant from the returning gas. An ordinary trap on this line will separate the liquid, but as the liquid is at the evaporating temperature and must take up a great deal of heat to evaporate, the trap will rapidly fill with liquid unless means be provided to empty it, or some heating means is employed. If heat is employed, there is a great loss in refrigeration efficiency of the plant as a whole.

According to the present invention, the accumulator is employed as a trap, and is provided with inlet and outlet portions connected to the evaporator. Under conditions of operation, both gas and liquid may be present in the inlet and outlet portions. The gas in the inlet portion is passed by the automatic valve to the outlet portion so that it may return to the compressor, while liquid contained in the outlet portion is returned to the inlet portion for re-circulation into the evaporator.

An illustrative form of practicing the invention is shown in the accompanying drawings, in which:—

Figure 1 is a diagrammatic side elevation of a refrigerating plant.

Figure 2 is a vertical diametrical sectional view through an accumulator according to the present invention, substantially on line 2—2 of Fig. 3.

Figure 3 is an elevation of the same, with a part in section.

Figure 4 is a horizontal section substantially on line 4—4 of Fig. 3.

Figure 5 is a fragmentary side elevation, on a larger scale, showing the operating ratchet and pawl.

Figure 6:
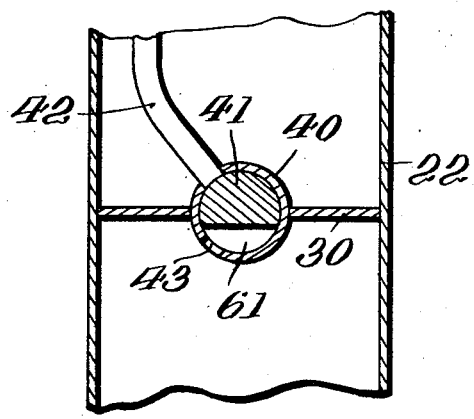
Figures 6 and 7 are detail sectional views through the gas valve on line 6—6 of Fig. 3, in different positions.

In these drawings, Fig. 1 illustrates a refrigerating plant comprising a compressor 10 which is driven from some suitable source of power. Gaseous refrigerant is passed through the return pipe line 11, being compressed in the compressor and delivered through the outgoing high pressure pipe line 12, through a stop valve 13 into the condenser 14 where the compressed gaseous refrigerant is reduced to liquid state. The liquid refrigerant passes through the pipe line 15 and stop valve 16 into the receiver 17. From time to time, as the operation requires, the liquid refrigerant passes through a valve 18 controlled for example by the float 19 within the receiver 17, through the outgoing liquid line 20 and through the expansion valve 21 into the lower compartment of the accumulator 22. From this lower compartment, the liquid passes the check valve 24' and flows through the evaporator feed pipe line 24 into the evaporating coils 25, where it takes up heat from the chamber C which is being cooled, and in whole or part is brought to gaseous form.

The gaseous refrigerant returns through the pipe line 26, past the stop valve 27 into the upper compartment of the accumulator 22, where any liquid is deposited, and only the gaseous refrigerant passes the control valve 28 back into the gaseous refrigerant return pipe line 11, to the compressor again.

As shown in Figs. 2 and 3 the accumulator 22 is closed at its ends, and is provided with a horizontal partition 30 which divides it into upper and lower compartments as aforesaid. The lower compartment receives the liquid line 20, the end of which opens into a vertical standpipe 31 with an upper end open to the lower compartment near its top, while the lower end extends downward to a point adjacent the bottom of the accumulator and is open thereto below the normal liquid level therein. A baffle wall 32 extends across the bottom of this compartment and projects upwardly above the lower end of the standpipe 31 with perforations 36 at the top to provide outlet for flash gas, whereby to provide an oil trap or sump so that any oil entering with the condensed liquid refrigerant may be separated and retained at the left hand side of this baffle 32, and may be drawn off from time to time through the oil purging pipe 33. Liquid refrigerant in the bottom of the bottom compartment may flow through the check valve 24' into the pipe line 24 as described above.

As the mingled liquid and gaseous refrigerant returns through the pipe 26 and the valve 27 from the evaporator 25, it is projected against a baffle surface 34, so that the liquid therein is separated and caused to form a pool 35 at the bottom of the top compartment of the accumulator 22. The gas flows off through the pipe 11 as described above.

The partition 30 is provided at its center with a cylindrical housing 40 which receives a rotatable valve member 41. This housing is connected at a point above the partition 30 with a gas vent pipe 42 which extends upwardly in the top compartment and opens thereto. Below the partition 30, aperture 43 is provided in the housing 40, substantially in vertical alinement with the lower end of the gas vent pipe 42 in the illustrated example.

Below the partition 30, the housing 40 is likewise provided with a pair of drain pipes 44 which extend downward in the bottom compartment and open therein at a point below the normal liquid level in this bottom compartment. The pipes 44 are identical in purpose and construction, and are located adjacent the ends of the housing, within the bottom compartment; and only one need be described in detail. Vertically above the upper ends of the pipes 44, and opening into the top compartment are provided the apertures 45 in the housing 40.

The housing 40 (Fig. 3) is preferably carried through the side walls of the accumulator 22, and is closed at one end by a cap 46. The housing, cap, accumulator walls and partition are preferably welded together for tightness. At the other end, the housing 40 is open for the insertion or removal of the valve body 41, being provided with a packing gland device 47 to prevent the passage of liquid or gaseous refrigerant.

The valve body 41 has a stem 48 projecting through the packing 47 and provided at its outer end with a ratchet wheel 49 which cooperates with a pawl 50 carried on a radial arm 51 pivotally mounted at the outer end of the stem 48. This arm 51 is connected, in the illustrated form, by a reciprocating link rod 52 with a crank pin 53 on the shaft of the compressor. As the compressor revolves, the link 52 is reciprocated, the radial arm 51 rocks and the pawl 50 causes an intermittent movement of the ratchet 49 and thus a continual rotative movement of the valve body 41. The valve body 41 is provided with three flattened portions 60, 61, 62. The flattened portions 60, 61 during the rotation of the valve body 41 come into the position shown in Fig. 9 to establish communication from the top compartment through the aperture 45, past the flattened portion 60 (for example), and by the drain pipe 44, to the bottom compartment, so that liquid in the pool 35 may flow freely downward into the bottom compartment for re-circulation into the evaporator.

Figure 7:
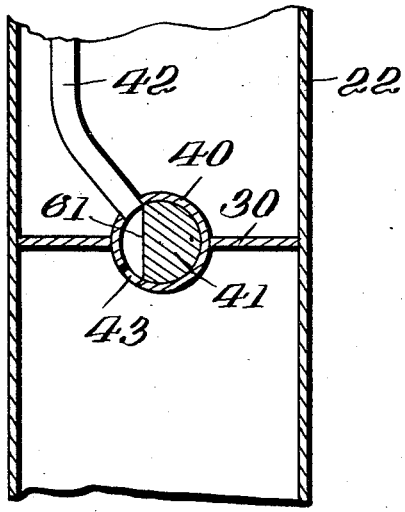

At the same time, as shown at Fig. 7, a communication is provided from the bottom compartment through the aperture 43, past the flattened portion 61 of the valve body 41, and by the gas vent pipe 42 into the top compartment, so that gas which may be present in the bottom compartment is momentarily free to flow into the top compartment.

Figure 8:
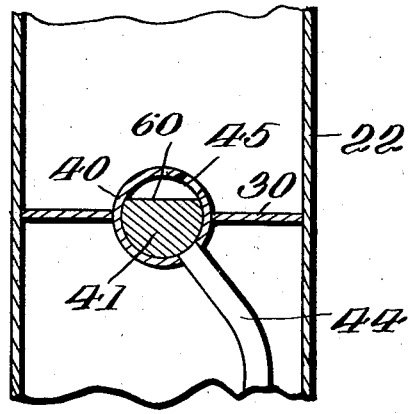
Figures 8 and 9 are detail sectional views through the liquid valve on the section line 8—8 of Fig. 3, in different positions.

During the operation of the refrigerating plant the rotating valve revolves continuously. During a portion of its rotation it approaches and then leaves the position shown at Fig. 6 and Fig. 8 of the drawings. During this portion of the rotation the rotating valve is closed and all communication between the upper and lower portions of the accumulator is stopped. During this portion of the rotation the liquid refrigerant which in the receiver is at a relatively high temperature and pressure, is passing through valve 21 and entering the lower portion of the accumulator. Since the pressure under which the liquid is held is reduced from the relatively high pressure of the condensing side to the relatively low pressure of the evaporating side when it passes valve 21, a portion of the refrigerating liquid evaporates, whereby to reduce the remainder of the liquid refrigerant to the temperature corresponding to the evaporating pressure of the evaporating side, as represented by that portion of the evaporating side which exists as the lower compartment of accumulator 22, gradually increasing the pressure in the lower compartment of Fig. 2 to a pressure above that existing in the evaporating coil 25, this difference in pressure forcing the liquid from the bottom of the lower compartment of accumulator 22 through the line 24 and into the refrigerating coil 25. The accumulation of flash gas in the gas trap formed by the lower compartment of the accumulator continues during this portion of the cycle.

Figure 9:
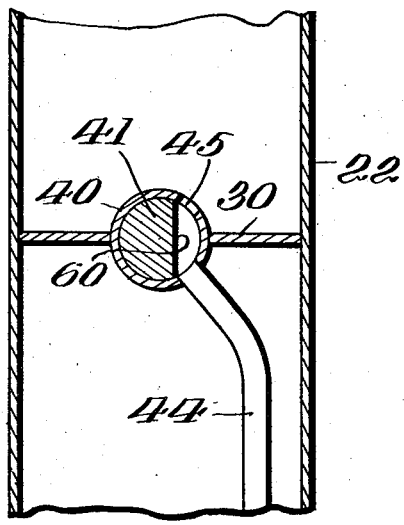

As valve body 41 continues to rotate, it approaches and then leaves the position shown in Figures 7 and 9, thus relieving the pressure in the lower compartment of accumulator 22 and equalizing it with the pressure in the upper compartment of Fig. 2. At the same time any liquid in the upper compartment of Fig. 2 is permitted to drain through pipe 44 to the lower compartment of accumulator 22, and thus combine and mix with the incoming liquid from the compression side of the refrigerating system. The check valve 24' in the illustrated form of the apparatus operates during this portion of the cycle to prevent any return of liquid refrigerant from the evaporator into the lower compartment of the accumulator so that the accumulator rapidly establishes an initial condition in which the flash gas has been relieved from the lower compartment and liquid refrigerant has drained from the upper compartment. During the still further rotation of valve body 41 it again assumes the position approaching and then leaving those shown at Figures 6 and 8, during which period of time the building up of pressure in the lower compartment of accumulator 22 again forces the liquid in the bottom of that compartment, (which combines both the incoming liquid and the liquid trapped from the returning evaporated gaseous refrigerant) through valve 24' and line 24, into the evaporating coil 25.

Thus, during the course of operation of the refrigerating plant liquid returning with the gaseous refrigerant from the evaporating coils is trapped into the upper compartment of the accumulator, then passed to the lower compartment of the accumulator, and finally returned to the evaporating coils of the system, this process being carried on intermittently and at regular intervals, depending upon the speed at which valve body 41 is rotating. At the same time, gas produced in cooling the incoming liquid from the compression side of the refrigerating plant is intermittently by passed from the lower compartment of the accumulator to the upper compartment and passed directly back to the compression part of the system, without having to pass through the evaporating coils.

Where the compressor and the accumulator are so located with reference to each other as to make it inconvenient to make the interconnecting ratchet drive, the rotating valve can be driven instead by means of a small motor or other power source suitably engaged.

It is obvious that the invention is not limited to the illustrated form, but may be modified in many ways within the scope of the attendant claims.

Having thus described the invention, what is claimed is:—

1. In a refrigerating system including a compressor, a condenser, an expander and an evaporator, and pipe lines connecting the same in circuit, the combination of a liquid trap located in the pipe line from the evaporator to the compressor, conduit means for connecting said trap to the evaporator inlet whereby liquid may be returned to the evaporator, a valve to close said conduit, and constantly operated means to open and close said valve intermittently.

2. In a refrigerating system including a compressor, a condenser, an expander and an evaporator, and pipe lines to connect the same in circuit, means providing an expansion chamber between said expander and said evaporator in which a part of the liquid refrigerant may evaporate to cool the remaining refrigerant to evaporating temperature, a conduit through which the evaporated refrigerant in said chamber may pass directly for return to the compressor, a valve in said conduit, and constantly operated means to open and close said valve intermittently.

3. A refrigerating system including a compressor having a rotating element, a condenser, an expander, an evaporator and pipe lines connecting the same in circuit, a liquid trap in the pipe line from the evaporator to the compressor and located above the evaporator inlet, a conduit connecting said trap to the evaporator inlet whereby liquid may be returned to the evaporator, a valve to close said conduit, and means actuated by said rotating element to intermittently open and close said valve.

4. A refrigerating system including a compressor having a rotating element, a condenser, an expander, an evaporator and pipe lines connecting the same in circuit, means providing an expansion chamber between the expander and evaporator in which a part of the liquid refrigerant may evaporate to cool the remaining refrigerant to evaporating temperature, a conduit through which the evaporated refrigerant in said chamber may pass directly for return to the compressor, a valve in said conduit, and means operated by said rotating element to intermittently open and close said valve.

5. In a refrigerating system including a compressor, an evaporator and an expansion valve, an accumulator having a partition to provide upper and lower compartments therein, the lower compartment being connected to the expansion valve and to the inlet of the evaporator of the system, and the upper compartment being connected to the compressor and to the outlet of the evaporator of the system, means providing a conduit of direct communication from the upper to the lower compartment, a valve to close said conduit whereby to shut off direct communication between said compartments, and means whereby said valve may be opened and closed periodically.

6. In a refrigerating system including an accumulator, a partition to divide said accumulator into upper and lower chambers, a valve housing formed on said partition, and a rotatable valve member located in said housing, said housing and body being provided with apertures whereby communication may be established between the upper and lower compartments.

7. An accumulator as in claim 6, in which a plurality of passages are provided, and including a vent pipe extending upwardly in said upper compartment from said housing so that gas passing said valve body and moving through said vent pipe will be delivered from said lower compartment to the upper portion of said upper compartment.

8. An accumulator as in claim 6, in which a plurality of passages are provided, and including a drain pipe in said lower compartment connected to said housing in communication with one of said apertures whereby liquid from said upper compartment may pass said valve body and be delivered through said corresponding passage and drain pipe to the lower part of said lower compartment.

9. In a refrigerating system including an accumulator, means dividing said accumulator into upper and lower compartments, a conduit connecting said compartments, a rotatable valve to close said conduit, a ratchet fixed to the body of said valve, a pawl for cooperating with said ratchet, and constantly operated means to oscillate said pawl.

10. In a refrigerating system including a compressor, a condenser, an expander and an evaporator, and pipe lines to connect the same in circuit, a liquid trap located in the pipe line from the evaporator to the compressor, means providing an expansion chamber located in the conduit from said expander to said evaporator, a liquid conduit from said liquid trap to said expansion chamber, valve means to open and close the said conduits, and constantly operated means to intermittently open and close said valve means.

11. In a refrigerating system including an accumulator, means dividing said accumulator into upper and lower compartments, a gas conduit extending from the upper part of said lower compartment to the upper part of said upper compartment and a liquid conduit extending from the lower part of said upper compartment to the lower part of said lower compartment, a single valve body interposed in said conduits, and intermittently operated means for actuating said valve body to open and close said conduits periodically.

12. In a refrigerating system including a compressor, a condenser, an expander, an evaporator, and pipe lines to connect the same in circuit, a liquid trap in the pipe line from the evaporator to the compressor, means providing an expansion chamber in the pipe line between the expander and the evaporator, a liquid conduit from the lower portion of said liquid trap to the lower portion of said expansion chamber, a gas conduit from the upper portion of said expansion chamber to the upper portion of said liquid trap, valve means in said conduits, and intermittently operated means to open said conduits simultaneously so that liquid can move into said expansion chamber and gas move into said liquid trap without obstructing one another.

13. In a refrigerating system including a compressor, a condenser, an expander and an evaporator, and pipe lines connecting the same in circuit, the combination of a liquid trap located in the pipe line from the evaporator to the compressor, a gas trap located in the pipe line leading from the expander to the evaporator, and intermittently operated valve means for establishing direct communication between said traps from time to time whereby the trapped liquid may pass directly from the liquid trap toward the evaporator inlet and the trapped gas may pass directly from the gas trap toward the compressor, and for closing said direct communication.

14. In a refrigerating system including a compressor, a condenser, an expander and an evaporator, and pipe lines connecting the same in circuit, the combination of a liquid trap included in the pipe line from the evaporator to the compressor, a gas trap included in the pipe line leading from the expander to the evaporator and positioned at a lower level than said liquid trap, and intermittently operated means to connect said traps from time to time whereby to equalize the pressures prevailing therein so that the liquid in said liquid trap may flow therefrom toward the evaporator inlet directly, and the gas in the gas trap may flow directly toward said compressor.

15. In a refrigerating system, a compressor, a condenser, an expansion valve and pipe lines for connecting the same, an evaporator, a liquid conduit for connecting said valve to said evaporator, a gas return conduit for connecting said evaporator to said compressor, a gas trap included in said liquid conduit whereby the pressure of flash gas in said trap may operate to force the liquid refrigerant into said evaporator, a valve conduit for relieving the flash gas from said trap and means for intermittently opening and closing the valve of said conduit from time to time.

16. In a refrigerating system, a compressor, a condenser, an expansion valve and pipe lines for connecting the same, an evaporator, a liquid conduit for connecting said valve to said evaporator and including a portion below a predetermined liquid level in said evaporator, a non-return valve in said liquid conduit, a gas return conduit for connecting said evaporator to said compressor, a gas trap included in said liquid conduit and located between the expansion valve and said non-return valve at a higher level than said portion whereby the pressure of flash gas in said trap may operate to raise the liquid refrigerant into said evaporator, and means to relieve the flash gas from said trap from time to time.

17. In a refrigerating apparatus, a compressor, a condenser, an expansion valve and pipe lines for connecting the same, an evaporator, an accumulator having upper and lower compartments, said lower compartment being located below a predetermined liquid level in said evaporator and forming a trap for flash gas, a liquid conduit for connecting said valve to said evaporator and including said lower compartment, a gas conduit for connecting said evaporator to said compressor and including said upper compartment, and intermittently operating means to relieve the flash gas from said lower compartment into said upper compartment and to pass the liquid from said upper compartment into said lower compartment whereby the pressure of flash gas forming in said lower compartment between such intermittent reliefs of flash gas will operate to force the liquid refrigerant from said lower compartment into said evaporator.

18. In a refrigerating system including a compressor, a condensor, an expander, an evaporator, and conduits for connecting the same in circuit, the combination of a gas trap in the said conduit for connecting the expander and the evaporator, means for equalizing the pressures at the inlet and outlet of the evaporator and permitting trapped gas to pass back toward the compressor, said means including a gas relief conduit from said trap and communicating with the said conduit which connects the evaporator and the compressor, and valve means for closing said relief conduit whereby a pressure of trapped gas may be built up for forcing liquid refrigerant from said trap to the evaporator.

19. In a refrigerating system including a compressor, a condenser, an expander, an evaporator, and conduits for connecting the same in circuit, the combination of a gas trap located in the said conduit for connecting the expander and the evaporator, a liquid trap located in the said conduit for connecting the evaporator and the compressor, conduit means for establishing communication between said traps so that trapped gas may flow to said liquid trap and trapped liquid to said gas trap, and valve means for closing said conduit means.

20. In a refrigerating system including a compressor, a condenser, an expander, an evaporator, and conduits for connecting the same in circuit, the combination of a gas trap in the said conduit for connecting the expander and the evaporator and located at a lower level than said evaporator, a liquid trap between the evaporator and compressor, conduit means for establishing communication between said traps, and valve means for closing said conduit means whereby, when said valve means is closed, the pressure of trapped gas in said gas trap will operate to force liquid from said trap into said evaporator, and when said valve means is opened trapped gas may pass to the liquid trap and compressor without going through the evaporator, and trapped liquid may pass to the gas trap for return to the evaporator.

In testimony whereof, I affix my signature.
NORMAN H. GAY.